May 31, 1927. 1,630,944

L. R. INGERSOLL

EYE MODEL

Filed Oct. 19, 1925

Inventor:
Leonard Rose Ingersoll

Patented May 31, 1927.

1,630,944

UNITED STATES PATENT OFFICE.

LEONARD ROSE INGERSOLL, OF MADISON, WISCONSIN.

EYE MODEL.

Application filed October 19, 1925. Serial No. 63,407.

The invention relates to an improvement in models to illustrate the action of the eye as an optical instrument, for purposes of experimental demonstration and instruction. It may be briefly described as an apparatus, a type of camera obscura, somewhat like an eyeball in shape (although considerably larger), in which an optical image of some external object is caused to fall on a screen or retina so that it can be observed and studied. With the aid of various lenses and other auxiliary apparatus, described later, it is thus possible to illustrate and study the simple optical principles of the normal eye, as well as the cause of and correction for such defects as near-sightedness, far-sightedness and astigmatism. Important features of the improved apparatus are that it is so designed that darkening of the room is unnecessary in studying or demonstrating it; that it approximates somewhat closely the form, construction of, and optical conditions in the actual eye, thus rendering the demonstrations and experiments more graphic; that it is of relatively unbreakable construction; that it is suitable for observation by the demonstrator or instructor and by several students or on-lookers at the same time; and that it provides peculiarly convenient and satisfactory means of studying the defects of far-sightedness, near-sightedness and astigmatism, and their correction.

Figure 3:
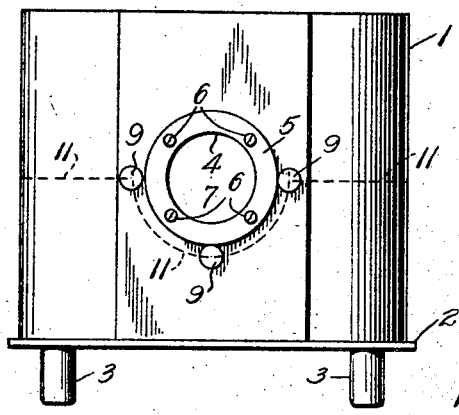
Figure 4:
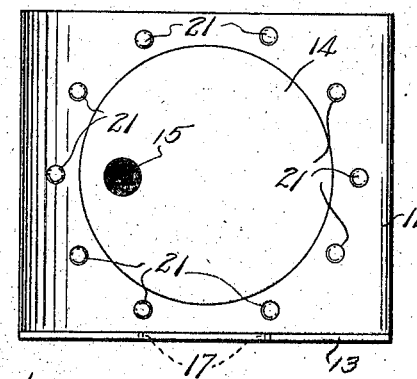
Figure 1:
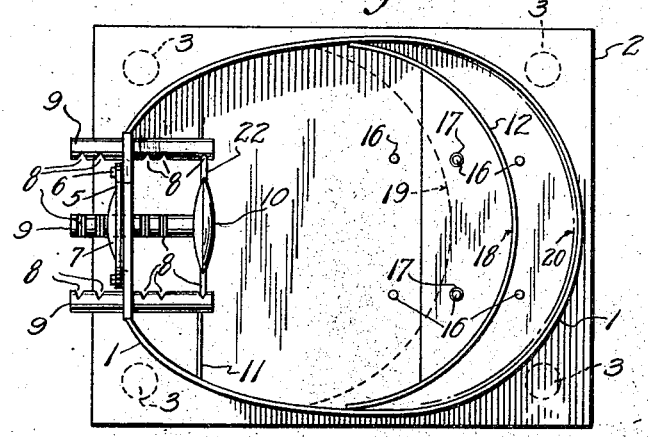
Figure 2:
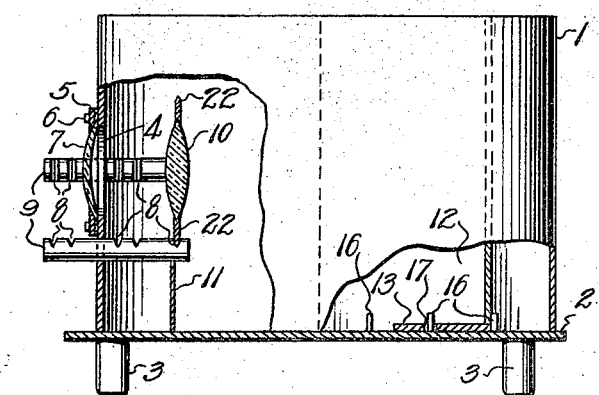

The invention in its essential form is illustrated in the accompanying drawing, in which Fig. 1 is a horizontal section or top view of the model as it appears without the addition of correcting lenses; Fig. 2 is a side view; Fig. 3 is a front view of the model and Fig. 4 a front view of the retina or screen.

The detailed description is as follows:—

The body of the instrument is a water-tight chamber or tank 1, nearly oval in shape, mounted on a flat base 2, supported by short legs 3. This is preferably made of metal and a convenient size is about 8 inches long. The front of this artificial eyeball has a hole 4, over which is fastened by means of a ring and gasket 5, and screws 6, a converging meniscus lens 7, the cornea.

In front of and behind the cornea are a series of five guides 8, formed by three slotted posts 9, in which guides various lenses, mounted in circular metal frames, somewhat larger than the lenses, may be placed. The last guide behind the cornea is for the crystalline lens 10, mounted in a circular frame 22, and this guide is connected with a diaphragm 11, which divides the eyeball into two parts, but which, however, comes up but part way. The purpose of this diaphragm is to indicate the division of the eye into the chambers which hold the aqueous and vitreous humors, respectively. The place of these humors in this eye model is taken by water.

The retina is a curved metal plate 12, on a flat base 13, which fits on the flat base of the model. It has a large circular area 14, on its front or concave surface, painted white so that images formed on it are readily visible, with a black spot 15, on one side. This represents the blind spot of the real eye and images cast on it are invisible. The bottom of the eye model has a series of dowel pins 16, which engage corresponding holes 17, in the flat base of the retina and fix it in any one of three positions 18, 19, 20. Position 18, in which the retina is shown in the figure, gives what may be regarded as the eyeball of normal length; position 19 shortens the eyeball by a given amount and gives the effect of far-sighted vision (hypermetropia), while 20 lengthens it by the same amount and makes the eye myopic or near-sighted. These three discrete positions in which the retina may be fixed by dowel pins are regarded as essential features of this eye model, for they really give the observer three different eyeballs, i. e., normal, far-sighted and near-sighted, with which to work. To make this feature more effective, the retina makes close contact with the sides of the eye so as effectively to shut off from consideration the part back of it. To allow change of the retina from one position to another without splashing water it has a number of marginal holes 21.

The dowel pins 16 serve another useful purpose in that they prevent the retina from being moved by continuous adjustment so that focussing could be done by moving the retina alone; for in the real eye accommodation or focussing is brought about by changes in the curvature of the crystalline lens, the retina being fixed. Accordingly in this eye model, to approximate as closely as possible the true eye conditions, it is intended that focussing shall be done only by changing the crystalline lens 10, with or without the addition of auxiliary lenses.

The following auxiliary apparatus is required for use with this eye model:—

(1) A set of six lenses, mounted in circular metal frames to fit into the guides 8, of the following sorts:—Two convex spherical lenses of different focal lengths to be used as weak and strong crystalline lenses; convex and concave spherical lenses for correcting far- and near-sightedness, respectively; a strong concave cylindrical lens for producing astigmatism and a convex cylindrical lens for correcting it. These lenses must be of certain definite focal lengths, depending on the actual size of the model. In addition to these lenses is a diaphragm with hole smaller in size than 4, which when used in one of the guides 8, acts as a pupil of diminished size.

(2) A light source consisting of an incandescent lamp in a box having a window shaped like an eight-armed cross, with a ground-glass diffusing screen behind it.

The model is used in the following way:—
It is first filled nearly full of clear water to represent the aqueous and vitreous humors of the actual eye and is then placed facing a window or other bright object a given distance away. The weaker crystalline lens is then inserted behind the cornea and this is of such strength that a clear image is formed on the retina if this is in position 18 (normal eye). The main characteristics of this image, its inverted character, what happens when it falls on the blind spot, etc., can then be studied. The general form of this eye model and the fact that it is open only at the top makes it peculiarly easy to study this image without darkening the room in any way, and this is a very important feature as it allows the use of the model in a large general laboratory where students may be working at many other tasks and where darkening of the room would not be feasible.

With the aid of the lenses and lamp box already mentioned the main optical features of the eye may then be studied, including accommodation, far- and near-sightedness, and their correction, astigmatism (which is produced in this case by inserting the strong cylindrical lens behind the cornea) and its correction, vision without crystalline lens (as after operation for cataract), compound defects, and the action of the simple magnifier.

While I have illustrated and described in detail only a single form of my invention, I do not desire to be limited thereto, but intend covering all constructions and arrangements which fall within the scope of the appended claims.

I claim:

1. An eye model comprising a vessel with opaque vertical walls, open at the top, representing the eyeball, having, in horizontal section, and only in horizontal section, the general shape of the human eye, said vessel to be water-tight and designed for filling with water or other transparent liquid to represent the humors of the eye; an aperture in the front of said vessel representing the pupil; a glass lens fastened over said aperture, representing the cornea; a series of racks or guides in front of and behind said cornea for holding other lenses; a removable glass lens representing the crystalline lens; and a movable curved transverse opaque separating member representing the retina.

2. An eye model comprising a water-tight vessel with opaque vertical walls, open at the top, representing the eyeball, said vessel having in horizontal section, only, the general shape of the human eye; an aperture representing the pupil; lenses representing the cornea and crystalline lens; guides for holding other lenses; a transverse opaque member representing the retina; and a separating diaphragm to indicate the division of the eye into the chambers which hold the aqueous and vitreous humors, such humors in this case to be represented by water or other transparent liquid.

3. An eye model comprising a water-tight vessel with opaque vertical walls, representing the eyeball, said vessel being open at the top and having in horizontal section, only, the general shape of the human eye; an aperture representing the pupil, at one end of said vessel, for admitting rays of light; a lens fastened on the outside of said vessel over said aperture, representing the cornea; racks or guides in front of said aperture and outside said vessel for holding various lenses; racks or guides behind said aperture and within said vessel for holding lenses; a second lens removably mounted in said racks within said vessel, representing the crystalline lens; and a curved transverse opaque member, representing the retina, having its concave surface towards the crystalline lens, said concave surface being white save for a black spot to represent the blind spot of the eye.

4. An eye model comprising a water-tight vessel with opaque vertical walls, representing the eyeball, said vessel being open at the top and having in horizontal section, only, the general shape of the human eye; an aperture representing the pupil; lenses representing the cornea and crystalline lens; guides for holding lenses; a transverse screen representing the retina; and means for locating said screen at three discrete positions, whereby three definite lengths of eyeball may be represented and the optical characteristics thereof studied as further described in the specifications.

LEONARD ROSE INGERSOLL.